US012600906B2

(12) United States Patent
Wang et al.

(10) Patent No.: US 12,600,906 B2
(45) Date of Patent: Apr. 14, 2026

(54) RED-LUMINESCENT PHOSPHOR WITH LONG AFTERGLOW AND FABRICATION METHOD THEREOF

(71) Applicant: Nano and Advanced Materials Institute Limited, Hong Kong (CN)

(72) Inventors: Han Wang, Hong Kong (CN); Qingyi Yang, Hong Kong (CN); Jifan Li, Hong Kong (CN)

(73) Assignee: Nano and Advanced Materials Institute Limited, Hong Kong (CN)

( * ) Notice: Subject to any disclaimer, the term of this patent is extended or adjusted under 35 U.S.C. 154(b) by 813 days.

(21) Appl. No.: 17/822,192

(22) Filed: Aug. 25, 2022

(65) Prior Publication Data

US 2023/0090990 A1 Mar. 23, 2023

Related U.S. Application Data

(60) Provisional application No. 63/261,416, filed on Sep. 21, 2021.

(51) Int. Cl.
*C09K 11/77* (2006.01)

(52) U.S. Cl.
CPC .............................. *C09K 11/7787* (2013.01)

(58) Field of Classification Search
None
See application file for complete search history.

(56) References Cited

U.S. PATENT DOCUMENTS 10,845,762 B2 11/2020 Hashimoto et al.

FOREIGN PATENT DOCUMENTS

JP 4105759 B2 6/2008

OTHER PUBLICATIONS

Katayama et al. Optical Materials, 79, 2019, 147-151 (Year: 2019).*
Yumiko Katayama et al., Enhanced persistent red luminescence in Mn2+-doped (Mg,Zn)GeO3 by electron trap and conduction band engineering, Optical Materials, vol. 79, pp. 147-151.
First Office Action of CN2022111183443 issued from the China National Intellectual Property Administration on Aug. 28, 2023.

* cited by examiner

*Primary Examiner* — Yun Qian
(74) *Attorney, Agent, or Firm* — S&F/WEHRW

(57) ABSTRACT

A red-luminescent long-afterglow phosphor, represented by $Mg_xZn_yGe_zO_3$: $aMn^{2+}$, $bEu^{3+}$, $cR^{3+}$. The phosphor is a kind of oxide compound based white powder. The phosphor powder synthesis process is environmentally friendly, no sintering-assisted gas required and no harmful gas generated during or after sintering. The phosphor powder can be excited by UV and is chemically stable.

19 Claims, 11 Drawing Sheets

RED-LUMINESCENT PHOSPHOR WITH LONG AFTERGLOW AND FABRICATION METHOD THEREOF

CROSS-REFERENCE TO RELATED APPLICATIONS

The present application claims priority from U.S. Provisional Patent Application No. 63/261,416, filed on Sep. 21, 2021, which is hereby incorporated by reference in its entirety.

TECHNICAL FIELD

The present disclosure relates to a phosphor having long-persistent red luminescence.

BACKGROUND

Persistent luminescence is an optical phenomenon in which a material emits energy in the visible spectrum for an appreciable time after the excitation source is removed. In a few cases, after the cessation of external excitation, some phosphorescent substance emits the energy after a decay, so they keep glowing after the radiation is turned off, decaying in brightness to a level perceivable with the naked eye over a period of milliseconds to days.

To date, the most common persistent luminescence is green phosphor. For example, the $MAl_2O_4$ series, wherein M=Ca, Sr, Ba doped with $Eu^{2+}$ and $Dy^{3+}$, exhibiting green afterglow to several hours. Comparing to green luminescence, there is fewer red luminescence products. The major problems are: chemical instability; special gas assisted synthesis; non-white powder color; short afterglow duration; afterglow wavelength deviating from red. For example, sulfide phosphors such as ZnS: $Cu^{2+}$, $Mn^{2+}$ (orange-red emission) suffer from chemically instability, light-orange powder color, poor heat stability, and poor stability upon light exposure.

Generally, powder color is critical in luminescence plastic products. It serves as dopant in plastic master batch and when the non-white powder is mixed with a non-white plastic master batch, there will be a color deviation. Although oxysulfide based phosphorescent phosphors, such as $Y_2O_2S$: $Eu^{3+}$, $Mg^{2+}$, $Ti^{4+}$ (orange-red emission), are white powders, all of them need special gas for synthesis, such as sulfur and reducing gas. They also suffer from a problem that a sulfurous odor is emitted. Another orange-reddish sulfur-free phosphor disclosed in U.S. Pat. No. 10,845,762 describes a compound represented by $MSi_2O_2N_2$: Yb, R, where M is metal element. To synthesize the compound, $H_2/N_2$ forming gas is required.

A few research groups have reported $(Mg,Zn)GeO_3$ series red phosphors, where the dopants are Mn and Eu. They found that the persistent radiance of the $(Mg_{0.5}Zn_{0.5})GeO_3$: $Mn^{2+}$, $Eu^{3+}$ sample at 1 h after ceasing UV light was 46 times stronger than that of $MgGeO_3$: $Mn^{2+}$, $Eu^{3+}$, and 11 times stronger than that of $ZnGa_2O_4$: $Cr^{3+}$ deep red persistent phosphor. However, the afterglow intensity and duration are still far inferior to $MAl_2O_4$ based green phosphors.

A need therefore exists for a novel red-luminescent phosphor that eliminates or at least diminishes the disadvantages and problems described above.

SUMMARY

An object of the present disclosure is to provide a red-light-emitting long-persistent-luminescent phosphor white powder, which is chemically stable and does not require a special gas to synthesize. The afterglow duration of the phosphor described herein can last from minutes to hours; the initial afterglow intensity can be even 10 times higher than reported $(Mg_{0.5}Zn_{0.5})GeO_3$: $Mn^{2+}$, $Eu^{3+}$ phosphors without compromising afterglow duration; depending on the designed host formulation and dopants. In certain embodiments, the red-luminescent phosphor can be excited via visible light.

The long-persistent-luminescent phosphor powder of the present disclosure has a chemical formula: $Mg_xZn_yGe_2O_3$: $aMn^{2+}$, $bEu^{3+}$, $cR^{3+}$, wherein R is at least one element selected from erbium (Er), thulium (Tm), holmium (Ho), samarium (Sm), prascodymium (Pr), ytterbium (Yb) and neodymium (Nd). The red-luminescent phosphor powder can be synthesized by doping manganese (Mn), curopium (Eu) and R ions into a host crystal of $Mg_xZn_yGe_2O_3$. $Mn^{2+}$ serves as activator, while $Eu^{3+}$ serves as first sensitizer and $R^{3+}$ serves as second sensitizer.

The crystal structure of host depends on the molar ratio between (Mg+Zn) and Gc. Increasing the amount of Ge, the crystal lattice turns to be more compact, featuring red luminescence. Decreasing the amount of Ge will lead to a loose crystal lattice, which can exhibit green luminescence. The energy level, i.e., bandgap, can be determined by the molar ratio of Mg and Zn. Increasing the amount of Mg can increase the bandgap of host therefore only allowing high energy UV excitation. Decreasing the amount of Mg can narrow the bandgap of host therefore even visible light can excite the luminescence. The combination of activator and sensitizer can induce traps states within the bandgap. Generally, the activator can determine the emission bandwidth, while sensitizer can serve as inner steps within the bandgap, performing as trap states to extend afterglow duration.

The high temperature air-sintered red phosphor powder is chemically stable. Powder color of the present phosphor is white in the non-excited state. No harmful substance generated during and after sintering. Irradiated via UV light source, the emission peak corresponds to 680 nm, featuring a red luminescence.

In a first aspect, provided herein is a phosphor having a chemical formula: $Mg_xZn_yGe_zO_3$: $aMn^{2+}$, $bEu^{3+}$, $cR^{3+}$, wherein R is an element selected from the group consisting of erbium (Er), thulium (Tm), holmium (Ho), samarium (Sm), praseodymium (Pr), ytterbium (Yb) and neodymium (Nd); $Mg_xZn_yGe_zO_3$ is a host material; and x, y, z, a, b and c are each independently positive numbers, wherein a is a molar ratio of $Mn^{2+}$ to the host material, b is a molar ratio of $Eu^{3+}$ to the host material, and c is a molar ratio of $R^{3+}$ to the host material.

In certain embodiments, $0.95 \le x+y \le 0.99$, $0.3 \le x \le 0.7$.
In certain embodiments, $1.00 \le z \le 1.5$.
In certain embodiments, $0.0001 \le a \le 0.02$.
In certain embodiments, $0.0001 \le b \le 0.05$.
In certain embodiments, $0.0001 \le c \le 0.005$.
In certain embodiments, $c<b$, wherein b is at least 2 times greater than c.
In certain embodiments, $0.95 \le x+y \le 0.99$, $0.3 \le x \le 0.7$, $1.0 \le z \le 1.5$, $0.0001 \le a \le 0.02$, $0.0001 \le b \le 0.05$, $0.0001 \le c \le 0.005$, $c<b$, wherein b is at least 2 times greater than c.
In certain embodiments, R is Tm, $0.50 \le x \le 0.60$, $0.95 \le x+y \le 0.99$, $1.0 \le z \le 1.3$, $0.001 \le a \le 0.003$, $0.006 \le b \le 0.01$, $0.0002 \le c \le 0.001$.
In certain embodiments, R is Tm, $0.35 \le x \le 0.42$, $0.95 \le x+y \le 0.99$, $1.0 \le z \le 1.3$, $0.005 \le a \le 0.02$, $0.002 \le b \le 0.008$, $0.0002 \le c \le 0.001$.

In certain embodiments, R is Er, $0.35 \leq x \leq 0.57$, $0.95 \leq x+y \leq 0.99$, $1.0 \leq z \leq 1.3$, $0.001 \leq a \leq 0.008$, $0.005 \leq b \leq 0.01$, $0.0002 \leq c \leq 0.001$.

In certain embodiments, R is Ho, $0.35 \leq x \leq 0.57$, $0.95 \leq x+y \leq 0.99$, $1.0 \leq z \leq 1.3$, $0.001 \leq a \leq 0.008$, $0.005 \leq b \leq 0.01$, $0.0002 \leq c \leq 0.001$.

In certain embodiments, R is Pr, $0.35 \leq x \leq 0.57$, $0.95 \leq x+y \leq 0.99$, $1.0 \leq z \leq 1.3$, $0.001 \leq a \leq 0.008$, $0.005 \leq b \leq 0.01$, $0.0002 \leq c \leq 0.001$.

In certain embodiments, R is Nd, $0.35 \leq x \leq 0.57$, $0.95 \leq x+y \leq 0.99$, $1.0 \leq z \leq 1.3$, $0.001 \leq a \leq 0.008$, $0.005 \leq b \leq 0.01$, $0.0002 \leq c \leq 0.001$.

In certain embodiments, R is Sm, $0.35 \leq x \leq 0.50$, $0.95 \leq x+y \leq 0.99$, $1.0 \leq z \leq 1.3$, $0.001 \leq a \leq 0.008$, $0.002 \leq b \leq 0.01$, $0.0001 \leq c \leq 0.002$.

In certain embodiments, R is Yb, $0.35 \leq x \leq 0.50$, $0.95 \leq x+y \leq 0.99$, $1.0 \leq z \leq 1.3$, $0.001 \leq a \leq 0.008$, $0.0002 \leq b \leq 0.01$, $0.0001 \leq c \leq 0.001$.

In certain embodiments, the phosphor is a powder.

In certain embodiments, the phosphor has an emission peak between 650-700 nm.

In certain embodiments, the phosphor has an emission peak between 670-690 nm.

In a second aspect, provided herein is a method of preparing a phosphor described herein, the method comprising: contacting a $Mg^{2+}$ salt, a $Zn^{2+}$ salt, $GeO_2$, a $Mn^{2+}$ salt, $Eu_2O_3$, and a metal oxide selected from the group consisting of $Er_2O_3$, $Tm_2O_3$, $Ho_2O_3$, $Sm_2O_3$, $Pr_6O_{11}$, $Yb_2O_3$ and $Nd_2O_3$, wherein each of the $Mg^{2+}$ salt and the $Zn^{2+}$ salt is independently an oxide, hydroxide, or carbonate salt; and the $Mn^{2+}$ salt is an oxide or carbonate salt; thereby forming a mixture; and sintering the mixture thereby forming the phosphor.

BRIEF DESCRIPTION OF DRAWINGS

The appended drawings, where like reference numerals refer to identical or functionally similar elements, contain figures of certain embodiments to further illustrate and clarify the above and other aspects, advantages and features of the present invention. It will be appreciated that these drawings depict embodiments of the invention and are not intended to limit its scope. The invention will be described and explained with additional specificity and detail through the use of the accompanying drawings in which.

DETAILED DESCRIPTION

Figure 1:
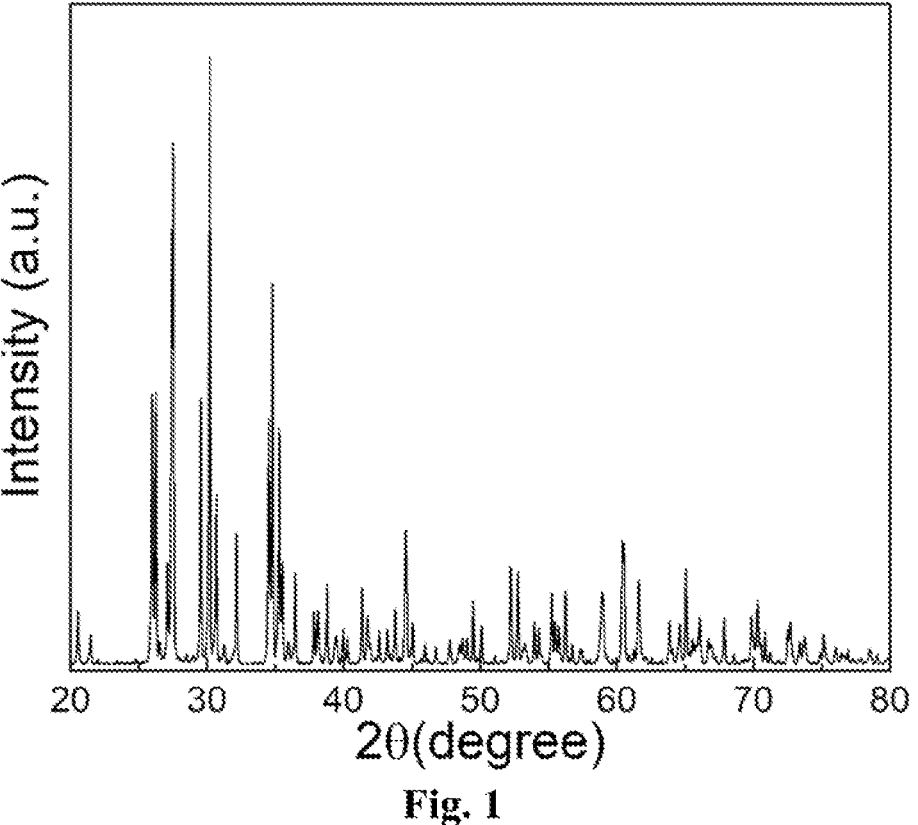
FIG. 1 shows a X-ray diffraction spectrum refers to $Mg_{0.56}Zn_{0.43}Ge_{1.2}O_3$: $0.002Mn^{2+}$, $0.008Eu^{3+}$, $0.0005Tm^{3+}$ according to Example 1.

The present disclosure discloses a red-luminescent long-afterglow phosphor. The synthesis of red-luminescent long-afterglow phosphor is described in different embodiments of the present disclosure.

The present disclosure provides a phosphor having a chemical formula: $Mg_xZn_yGe_zO_3$: $aMn^{2+}$, $bEu^{3+}$, $cR^{3+}$, wherein R is an element selected from the group consisting of erbium (Er), thulium (Tm), holmium (Ho), samarium (Sm), praseodymium (Pr), ytterbium (Yb) and neodymium (Nd); $Mg_xZn_yGe_zO_3$ is a host material; and x, y, z, a, b and c are each independently positive numbers, wherein a is a molar ratio of $Mn^{2+}$ to the host material, b is a molar ratio of $Eu^{3+}$ to the host material, and c is a molar ratio of $R^{3+}$ to the host material.

In certain embodiments, $0.95 \leq x+y \leq 0.99$, $0.3 \leq x \leq 0.7$.

In certain embodiments, $1.00 \leq z \leq 1.5$ or $1.05 \leq z \leq 1.5$.

In certain embodiments, $0.0001 \leq a \leq 0.02$ or $0.0001 \leq a \leq 0.005$.

In certain embodiments, $0.0001 \leq b \leq 0.05$.

In certain embodiments, $0.0001 \leq c \leq 0.005$.

In certain embodiments, $c < b$, wherein b is at least 2 times greater, 3 times greater, 4 times greater, or 5 times greater than c. In certain embodiments, b is between 2-10 greater, 3-10 greater, or 3-5 greater than c.

In certain embodiments, $0.95 \leq x+y \leq 0.99$, $0.3 \leq x \leq 0.7$, $1.0 \leq z \leq 1.5$, $0.0001 \leq a \leq 0.02$, $0.0001 \leq b \leq 0.05$, $0.0001 \leq c \leq 0.005$, $c<b$, wherein b is at least 2 times greater than c.

In certain embodiments, R is Tm, $0.50 \leq x \leq 0.60$, $0.95 \leq x+y \leq 0.99$, $1.0 \leq z \leq 1.3$, $0.001 \leq a \leq 0.003$, $0.006 \leq b \leq 0.01$, $0.0002 \leq c \leq 0.001$ or $0.50 \leq x \leq 0.60$, $0.95 \leq x+y \leq 0.99$, $1.1 \leq z \leq 1.3$, $0.001 \leq a \leq 0.003$, $0.006 \leq b \leq 0.01$, $0.0002 \leq c \leq 0.001$.

In certain embodiments, R is Tm, $0.35 \leq x \leq 0.42$, $0.95 \leq x+y \leq 0.99$, $1.0 \leq z \leq 1.3$, $0.005 \leq a \leq 0.02$, $0.002 \leq b \leq 0.008$, $0.0002 \leq c \leq 0.001$ or $0.35 \leq x \leq 0.42$, $0.95 \leq x+y \leq 0.99$, $1.1 \leq z \leq 1.3$, $0.005 \leq a \leq 0.02$, $0.002 \leq b \leq 0.008$, $0.0002 \leq c \leq 0.001$.

In certain embodiments, R is Er, $0.35 \leq x \leq 0.57$, $0.95 \leq x+y \leq 0.99$, $1.0 \leq z \leq 1.3$, $0.001 \leq a \leq 0.008$, $0.005 \leq b \leq 0.01$, $0.0002 \leq c \leq 0.001$ or $0.35 \leq x \leq 0.57$, $0.95 \leq x+y \leq 0.99$, $1.1 \leq z \leq 1.3$, $0.001 \leq a \leq 0.008$, $0.005 \leq b \leq 0.01$, $0.0002 \leq c \leq 0.001$.

In certain embodiments, R is Ho, $0.35 \leq x \leq 0.57$, $0.95 \leq x+y \leq 0.99$, $1.0 \leq z \leq 1.3$, $0.001 \leq a \leq 0.008$, $0.005 \leq b \leq 0.01$, $0.0002 \leq c \leq 0.001$ or $0.35 \leq x \leq 0.57$, $0.95 \leq x+y \leq 0.99$, $1.1 \leq z \leq 1.3$, $0.001 \leq a \leq 0.008$, $0.005 \leq b \leq 0.01$, $0.0002 \leq c \leq 0.001$.

In certain embodiments, R is Pr, $0.35 \leq x \leq 0.57$, $0.95 \leq x+y \leq 0.99$, $1.0 \leq z \leq 1.3$, $0.001 \leq a \leq 0.008$, $0.005 \leq b \leq 0.01$, $0.0002 \leq c \leq 0.001$ or $0.35 \leq x \leq 0.57$, $0.95 \leq x+y \leq 0.99$, $1.1 \leq z \leq 1.3$, $0.001 \leq a \leq 0.008$, $0.005 \leq b \leq 0.01$, $0.0002 \leq c \leq 0.001$.

In certain embodiments, R is Nd, $0.35 \leq x \leq 0.57$, $0.95 \leq x+y \leq 0.99$, $1.0 \leq z \leq 1.3$, $0.001 \leq a \leq 0.008$, $0.005 \leq b \leq 0.01$, $0.0002 \leq c \leq 0.001$ or $0.35 \leq x \leq 0.57$, $0.95 \leq x+y \leq 0.99$, $1.1 \leq z \leq 1.3$, $0.001 \leq a \leq 0.008$, $0.005 \leq b \leq 0.01$, $0.0002 \leq c \leq 0.001$.

In certain embodiments, R is Sm, $0.35 \leq x \leq 0.50$, $0.95 \leq x+y \leq 0.99$, $1.0 \leq z \leq 1.3$, $0.001 \leq a \leq 0.008$, $0.002 \leq b \leq 0.01$, $0.0001 \leq c \leq 0.002$.

In certain embodiments, R is Yb, $0.35 \leq x \leq 0.50$, $0.95 \leq x+y \leq 0.99$, $1.0 \leq z \leq 1.3$, $0.001 \leq a \leq 0.008$, $0.0002 \leq b \leq 0.01$, $0.0001 \leq c \leq 0.001$.

In certain embodiments, phosphor has an emission peak between 620-750 nm, 620-730 nm, 620-710 nm, 630-700 nm, 640-700 nm, 650-700 nm, 660-700 nm, 670-690 nm, or 680 nm.

In certain embodiments, the following raw materials serve as starting materials in a sintering fabrication. To compose the host, the oxides, hydroxides and carbonates of $Mg^{2+}$ and $Zn^{2+}$ may be utilized. To serve as an activator and a sensitizer, which are dopants, the oxides, MnO, $Eu_2O_3$, $Er_2O_3$, $Tm_2O_3$, $Ho_2O_3$, $Sm_2O_3$, $Pr_6O_{11}$, $Yb_2O_3$ and $Nd_2O_3$ can be selected. For $Mn^{2+}$, instead of oxide, carbonate may be selected. The starting materials of red-luminescent long-afterglow phosphor are not limited to oxides, hydroxides and carbonates.

In certain embodiments, the phosphor is prepared according to a method comprising: contacting a $Mg^{2+}$ salt, a $Zn^{2+}$ salt, $GeO_2$, a $Mn^{2+}$ salt, $Eu_2O_3$, and a metal oxide selected from the group consisting of $Er_2O_3$, $Tm_2O_3$, $Ho_2O_3$, $Sm_2O_3$, $Pr_6O_{11}$, $Yb_2O_3$ and $Nd_2O_3$, wherein each of the $Mg^{2+}$ salt and the $Zn^{2+}$ salt is independently an oxide, hydroxide, or carbonate salt; and the $Mn^{2+}$ salt is an oxide or carbonate salt; thereby forming a mixture; and sintering the mixture thereby forming the phosphor. In certain embodiments, the mixture is sintered in the presence of oxygen. In certain embodiments, the mixture is air sintered. In certain embodiments, the metals are combined in any stoichiometry described herein.

The starting materials are weighted according to the desired molar ratios, and then they are sufficiently wet mixed by a ball milling mixer with solvent such as ethanol. The sufficiently mixed starting materials with solvent are then transferred into a container and baked in an oven at a certain temperature according to the volatilization temperature of the solvent. For example, if using ethanol as solvent, the baking temperature can be set as 80° C. The baking process is to remove all the solvent and then obtain sufficiently mixed starting materials.

The above mixed starting materials are then sieved to decrease their stacking density. In other words, the purpose of sieving is to make the starting materials looser among each other, which favors efficient heat conduction and sintering.

The sufficiently sieved and mixed starting materials are put in a heat-resistant container such as aluminum oxide crucible or quartz crucible. Then, they are placed into a furnace and sintered at a temperature ranging from 1100° C. to 1350° C., holding for several minutes to hours in air atmosphere.

After cooling down, the sintered powder is ground to a fine powder and the red-luminescent long-afterglow phosphor is finally obtained.

The long-persistent-luminescent phosphor powder represented by $Mg_xZn_yGe_zO_3$: $aMn^{2+}$, $bEu^{3+}$, $cR^{3+}$, wherein R is an element selected from the group consisting of erbium (Er), thulium (Tm), holmium (Ho), samarium (Sm), praseodymium (Pr) ytterbium (Yb) and neodymium (Nd). The red-luminescent phosphor powder is synthesized by doping manganese (Mn) ions, europium (Eu) ions and R ions into host crystal of $Mg_xZn_yGe_zO_3$. $Mn^{2+}$ serves as activator, while $Eu^{3+}$ serves as first sensitizer and $R^{3+}$ serves as second sensitizer.

In certain embodiments, $x+y$ is smaller than 0.99 in the formula of $Mg_xZn_yGe_zO_3$: $aMn^{2+}$, $bEu^{3+}$, $cR^{3+}$. The non-stoichiometry can induce trap states to improve afterglow duration.

In certain embodiments, the x for Mg is ranging from 0.3 to 0.7.

In certain embodiments, the starting material of Mg is $Mg(OH)_2$, which is active in high temperature sintering, contributing longer afterglow.

In certain embodiments, the starting material of Zn is ZnO. $Zn(OH)_2$ may deteriorate the afterglow performance.

In certain embodiments, the molar ratio of germanium (Ge) is in excess. A low stoichiometry ratio of Ge may lead to a green florescence with a peak of 530 nm, plus red florescence and red afterglow with a peak of 680 nm. The excess molar amount of Ge can range from 5% to 50%. With increasing the molar amount of Ge, the peak of green florescence weakens and finally vanish.

In certain embodiments, the starting material of Mn is MnO. The molar ratio of $Mn^{2+}$ to the host material can range from 0.0001 to 0.02. $Mn^{2+}$ serves as activation center in $Mg_xZn_yGe_zO_3$ crystal cell. Lower concentration of $Mn^{2+}$ contributes limited amount of activation center and leads to incomplete luminescence, while higher concentration of $Mn^{2+}$ can result in concentration quenching effect thus deteriorate afterglow performance.

In certain embodiments, the molar ratio of $Eu^{3+}$ to the host material ranges from 0.0001 to 0.05. As first co-dopant and first sensitizer to the dopant and activator of $Mn^{2+}$, with adding of $Eu^{3+}$, afterglow performance can improve significantly.

In certain embodiments, the molar ratio of $R^{3+}$ to the host material ranges from 0.0001 to 0.005. As second co-dopant and second sensitizer to the dopant and activator of $Mn^{2+}$, the molar ratio of $R^{3+}$ is generally smaller than the molar ratio of $Eu^{3+}$ (e.g., about 3-10 times smaller), in case of concentration quenching effect happening. After adding second co-dopant, afterglow duration further improves.

In certain embodiments, depending on the generated shallow trap states within the host bandgap, the dopant element is Tm.

In certain embodiments, depending on the certain molar ratio of Mg and Zn (e.g., $0.35 \leq x \leq 0.42$, $0.95 \leq x+y \leq 0.99$), the photoluminescence excitation range broadens from UV to visible light.

In certain embodiments, depending on the certain molar ratio of Mg and Zn (e.g., $0.35 \leq x \leq 0.42$, $0.95 \leq x+y \leq 0.99$), the initial afterglow intensity enhanced to more than 10 times.

In certain embodiments, depending on the certain molar ratio of Mg and Zn (e.g., $0.50 \leq x \leq 0.60$, $0.95 \leq x+y \leq 0.99$), as well as the generated shallow trap states, the afterglow duration extends to 80 min.

Example 1

Based on the formula of $Mg_{0.56}Zn_{0.43}Ge_{1.2}O_3$: $0.002Mn^{2+}$, $0.008Eu^{3+}$. $0.0005Tm^{3+}$, the following starting materials were weighted: 20.100 g of magnesium hydroxide $(Mg(OH)_2)$ (0.56 mol in terms of Mg), 21.540 g of zinc oxide (ZnO) (0.43 mol in terms of Zn), 77.282 g of germanium oxide $(GeO_2)$ (1.2 mol in terms of Ge), 0.088 g of manganese oxide (MnO) (0.002 mol in terms of Mn), 0.920 g of europium oxide $(Eu_2O_3)$ (0.008 mol in terms of Eu), and 0.064 g of thulium oxide $(Tm_2O_3)$ (0.0005 mol in terms of Tm).

The above starting materials were then put into a nylon ball milling jar with zirconia milling balls. The milling medium is ethanol. A planetary mill machine was adopted to sufficiently mix the starting materials for 2 hours.

The resulting mixture was transferred into a clean tray and baked at 80° C. for overnight to fully evaporate ethanol. Then the dried mixture was sieved with a 120 mesh sieve.

The sieved mixture was put into an aluminum oxide crucible with an aluminum oxide lid covered on. Place the above into a muffle furnace. Heat the furnace from room temperature to 1220° C. with a rate of 5° C. per minute. Keep sintering at 1220° C. for 5 hours and naturally cool down to room temperature. All of the heating, sintering and cooling process were conducted in air atmosphere.

The resulted product was made to powder, through a grinding step, to obtain the red-luminescent long-afterglow phosphor.

X-ray diffraction analysis of the obtained red-luminescent phosphor of $Mg_{0.56}Zn_{0.43}Ge_{1.2}O_3$: $0.002Mn^{2+}$, $0.008Eu^{3+}$, $0.0005Tm^{3+}$ is shown in FIG. 1. The host crystal phase was $MgGeO_3$, indicating zinc ions occupied magnesium ions site in $MgGeO_3$ crystal cell.

A prior art phosphor with the formula of $Mg_{0.4977}Zn_{0.5}GeO_3$: $0.002Mn^{2+}$, $0.0003Eu^{3+}$ was synthesized as a comparison.

Figure 2:
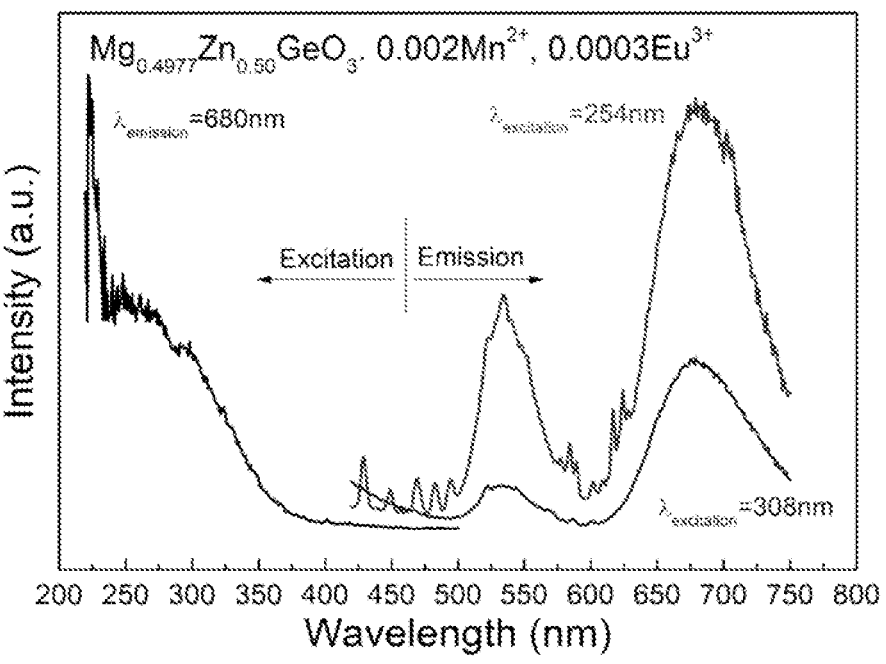
FIG. 2 shows excitation and emission spectra of a comparative phosphor $Mg_{0.4977}Zn_{0.5}GeO_3$: $0.002Mn^{2+}$, $0.0003Eu^{3+}$.
Figure 3:
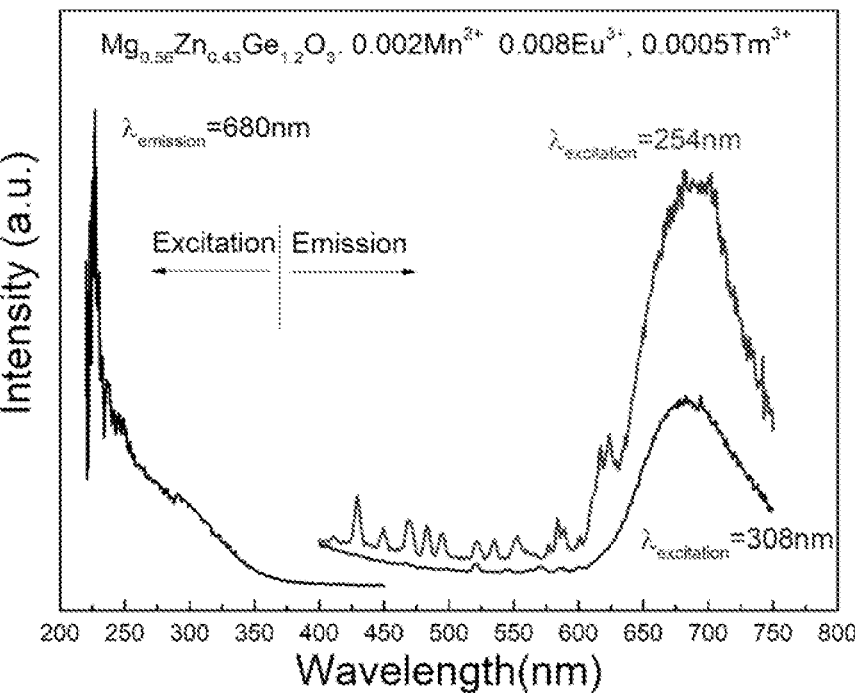
FIG. 3 shows excitation and emission spectra of $Mg_{0.56}Zn_{0.43}Ge_{1.2}O_3$: $0.002Mn^{2+}$, $0.008Eu^{3+}$, $0.0005Tm^{3+}$.

The excitation and emission spectra of the prior art phosphor and $Mg_{0.56}Zn_{0.43}Ge_{1.2}O_3$: $0.002Mn^{2+}$, $0.008Eu^{3+}$, $0.0005Tm^{3+}$ are shown in FIG. 2 and FIG. 3, respectively. For the prior art phosphor, besides the red emission peak of 680 nm, it also shows a sub-green emission peak of 530 nm. Therefore, the florescence performance of the prior art phosphor is a combination of red and green. For the phosphor obtained in Example 1 with the formula of $Mg_{0.56}Zn_{0.43}Ge_{1.2}O_3$: $0.002Mn^{2+}$, $0.008Eu^{3+}$, $0.0005Tm^{3+}$, the emission peak centered at 680 nm, demonstrating a pure red emission. The effective excitation for both was ranging in UV region with a peak of 230 nm.

Figure 4:
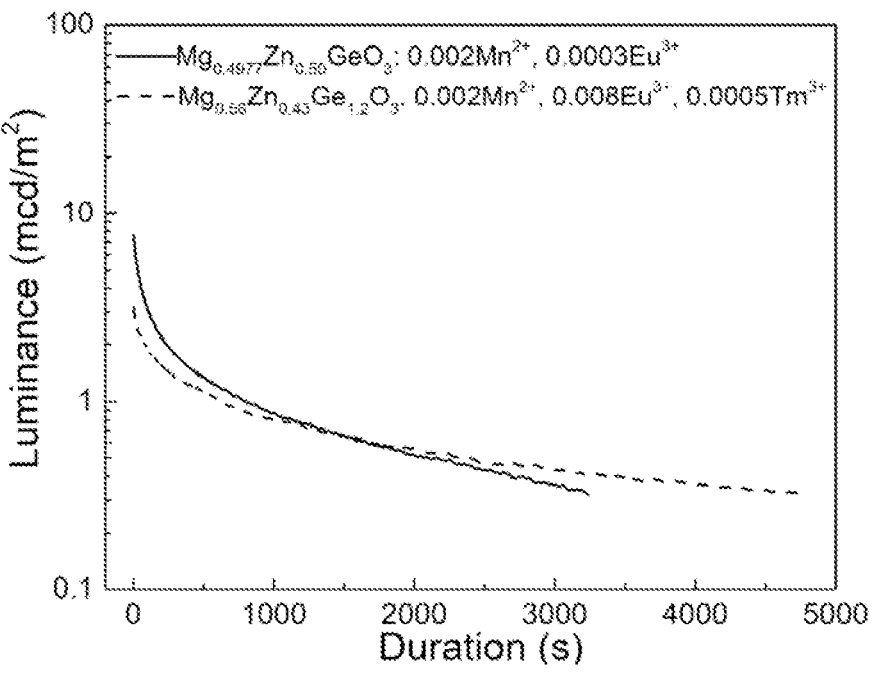
FIG. 4 shows afterglow duration of the prior art phosphor and $Mg_{0.56}Zn_{0.43}Ge_{1.2}O_3$: $0.002Mn^{2+}$, $0.008Eu^{3+}$, $0.0005Tm^{3+}$, based on the testing standard of DIN 67510-1.

The tested afterglow duration of the prior art phosphor and $Mg_{0.56}Zn_{0.43}Ge_{1.2}O_3$: $0.002Mn^{2+}$, $0.008Eu^{3+}$, $0.0005Tm^{3+}$, based on the testing standard of DIN 67510-1, is shown in FIG. 4. It should be noted here that according to the standard of DIN 67510-1, a 1000 lx D65 light source is adopted as excitation source, which is an artificial daylight 6500K. Because it is a full-spectrum light source, UV light only accounts for a small part, the power absorbed by the phosphor is much less than pure UV light source. The tested afterglow duration for prior art phosphor and $Mg_{0.56}Zn_{0.43}Ge_{1.2}O_3$: $0.002Mn^{2+}$, $0.008Eu^{3+}$. $0.0005Tm^{3+}$ is 54 and 80 minutes, respectively (to the time that the afterglow luminance decreased to 0.32 mcd/m²).

Figure 5:
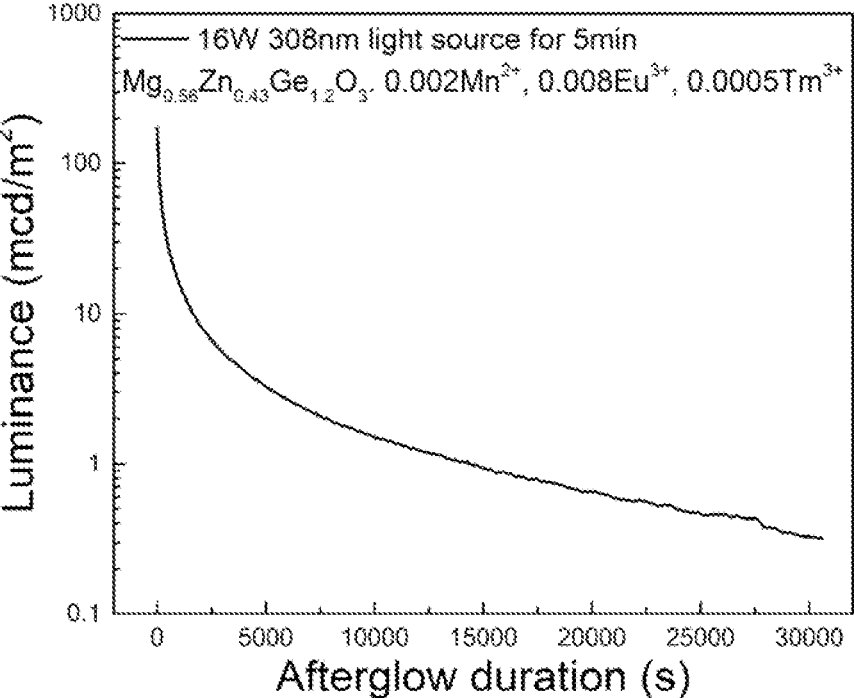
FIG. 5 shows afterglow duration of $Mg_{0.56}Zn_{0.43}Ge_{1.2}O_3$: $0.002Mn^{2+}$, $0.008Eu^{3+}$, $0.0005Tm^{3+}$, after excitation by 16 W 308 nm UV light source for 5 min.

As a comparison, a 16 W 308 nm UV light source was also adopted to replace the D65 light source to excite the phosphor of $Mg_{0.56}Zn_{0.43}Ge_{1.2}O_3$: $0.002Mn^{2+}$, $0.008Eu^{3+}$, $0.0005Tm^{3+}$. After irradiating onto the sample for 5 minutes, the resulted afterglow duration is 8 hours and 20 minutes, as shown in FIG. 5.

Example 2

Based on the formula of $Mg_{0.39}Zn_{0.60}Ge_{1.2}O_3$: $0.01Mn^{2+}$, $0.003Eu^{3+}$, $0.0005Tm^{3+}$, the following starting materials were weighted: 12.337 g of magnesium hydroxide $(Mg(OH)_2)$ (0.39 mol in terms of Mg), 26.485 g of zinc oxide (ZnO) (0.60 mol in terms of Zn), 68.077 g of germanium oxide $(GeO_2)$ (1.2 mol in terms of Ge), 0.385 g of manganese oxide (MnO) (0.01 mol in terms of Mn), 0.286 g of europium oxide $(Eu_2O_3)$ (0.003 mol in terms of Eu), and 0.052 g of thulium oxide $(Tm_2O_3)$ (0.0005 mol in terms of Tm).

The above starting materials were then put into a nylon ball milling jar with zirconia milling balls. The milling medium is ethanol. A planetary mill machine was adopted to sufficiently mix the starting materials for 2 hours.

The resulting mixture was transferred into a clean tray and baked at 80° C. for overnight to fully evaporate ethanol. Then the dried mixture was sieved with a 120 mesh sieve.

The sieved mixture was put into an aluminum oxide crucible with an aluminum oxide lid covered on. Place the above into a muffle furnace. Heat the furnace from room temperature to 1220° C. with a rate of 5° C. per minute. Keep sintering at 1220° C. for 5 hours and naturally cool down to room temperature. All of the heating, sintering and cooling process were conducted in air atmosphere.

The resulted product was made to powder, through a grinding step, to obtain the red-luminescent long-afterglow phosphor.

Figure 6:
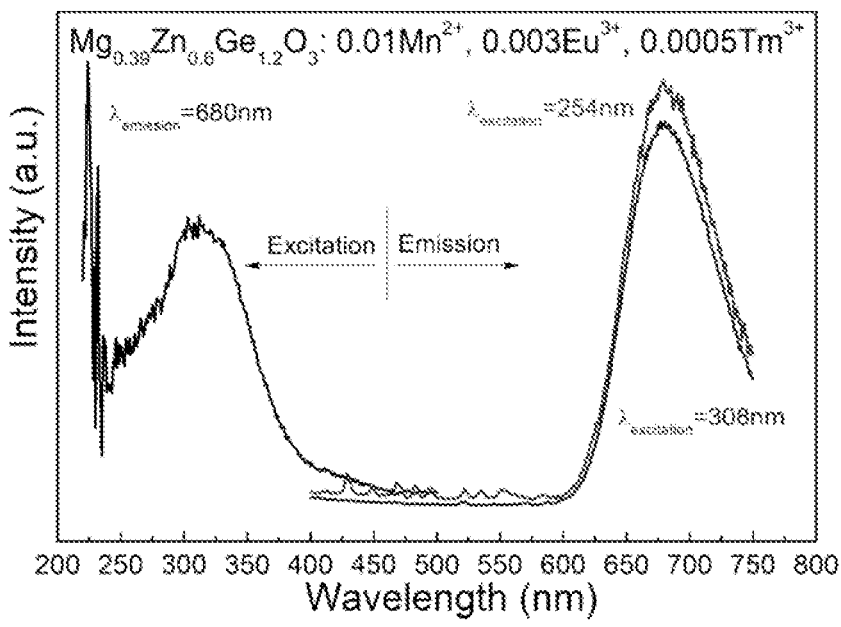
FIG. 6 shows excitation and emission spectra of $Mg_{0.39}Zn_{0.60}Ge_{1.2}O_3$: $0.01Mn^{2+}$, $0.003Eu^{3+}$, $0.0005Tm^{3+}$ according to Example 2.

The excitation and emission spectra of $Mg_{0.39}Zn_{0.60}Ge_{1.2}O_3$: $0.01Mn^{2+}$. $0.003Eu^{3+}$, $0.0005Tm^{3+}$, is shown in FIG. 6. The emission peak centered at 680 nm, demonstrating a pure red emission. The effective excitation was ranging in UV region with a peak of 230 nm. Comparing with excitation spectrum of prior art phosphor and the formula described in Example 1, the effective excitation region of UVB increases. In addition, the excitation region extends to visible light region.

Figure 7:
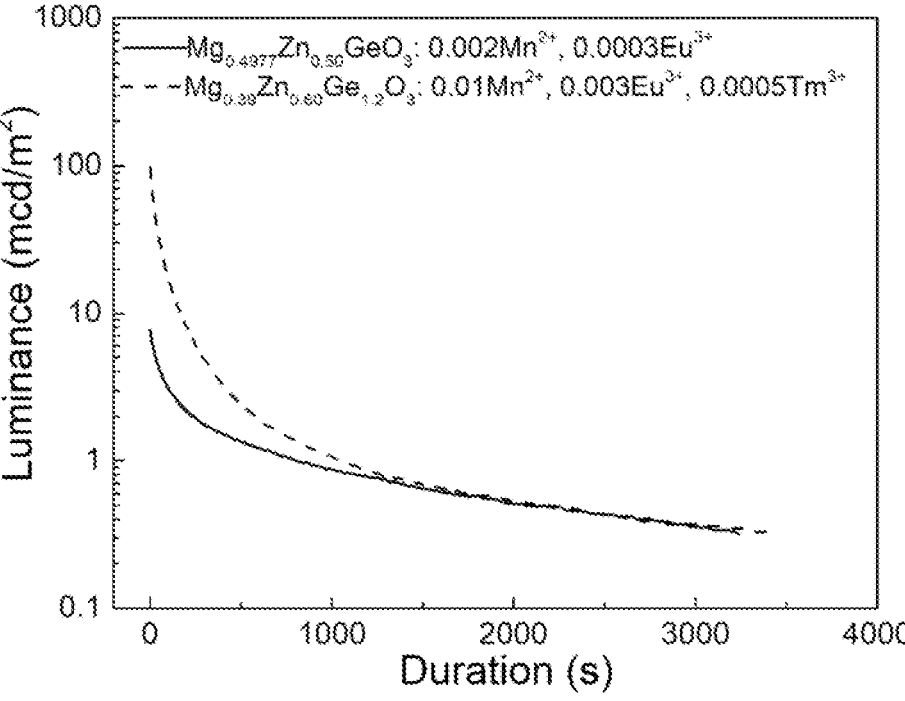
FIG. 7 shows afterglow duration of the prior art phosphor and $Mg_{0.39}Zn_{0.60}Ge_{1.2}O_3$: $0.01Mn^{2+}$, $0.003Eu^{3+}$, $0.0005Tm^{3+}$, based on the testing standard of DIN 67510-1.

The tested afterglow duration of the prior art phosphor and $Mg_{0.39}Zn_{0.60}Ge_{1.2}O_3$: $0.01Mn^{2+}$, $0.003Eu^{3+}$, $0.0005Tm^{3+}$, based on the testing standard of DIN 67510-1, is shown in FIG. 7. The tested afterglow duration for prior art phosphor and $Mg_{0.39}Zn_{0.60}Ge_{1.2}O_3$: $0.01Mn^{2+}$, $0.003Eu^{3+}$, $0.0005Tm^{3+}$ was 54 and 57 minutes, respectively. More attractively, the initial afterglow intensity of $Mg_{0.39}Zn_{0.60}Ge_{1.2}O_3$: $0.01Mn^{2+}$, $0.003Eu^{3+}$, $0.0005Tm^{3+}$ is 12 times greater than that of the prior art phosphor.

Example 3

Based on the formula of $Mg_{0.56}Zn_{0.43}GeO_3$: $0.002Mn^{2+}$, $0.008Eu^{3+}$, $0.0005Tm^{3+}$, the following starting materials were weighted: 20.100 g of magnesium hydroxide ($Mg(OH)_2$) (0.56 mol in terms of Mg), 21.540 g of zinc oxide (ZnO) (0.43 mol in terms of Zn), 64.402 g of germanium oxide ($GeO_2$) (1.0 mol in terms of Ge), 0.088 g of manganese oxide (MnO) (0.002 mol in terms of Mn), 0.920 g of europium oxide ($Eu_2O_3$) (0.008 mol in terms of Eu), and 0.064 g of thulium oxide ($Tm_2O_3$) (0.0005 mol in terms of Tm).

The above starting materials were then put into a nylon ball milling jar with zirconia milling balls. The milling medium is ethanol. A planetary mill machine was adopted to sufficiently mix the starting materials for 2 hours.

The resulting mixture was transferred into a clean tray and baked at 80° C. for overnight to fully evaporate ethanol. Then the dried mixture was sieved with a 120 mesh sieve.

The sieved mixture was put into an aluminum oxide crucible with an aluminum oxide lid covered on. Place the above into a muffle furnace. Heat the furnace from room temperature to 1220° C. with a rate of 5° C. per minute. Keep sintering at 1220° C. for 5 hours and naturally cool down to room temperature. All of the heating, sintering and cooling process were conducted in air atmosphere.

The resulted product was made to powder, through a grinding step, to obtain the phosphor.

Figure 8:
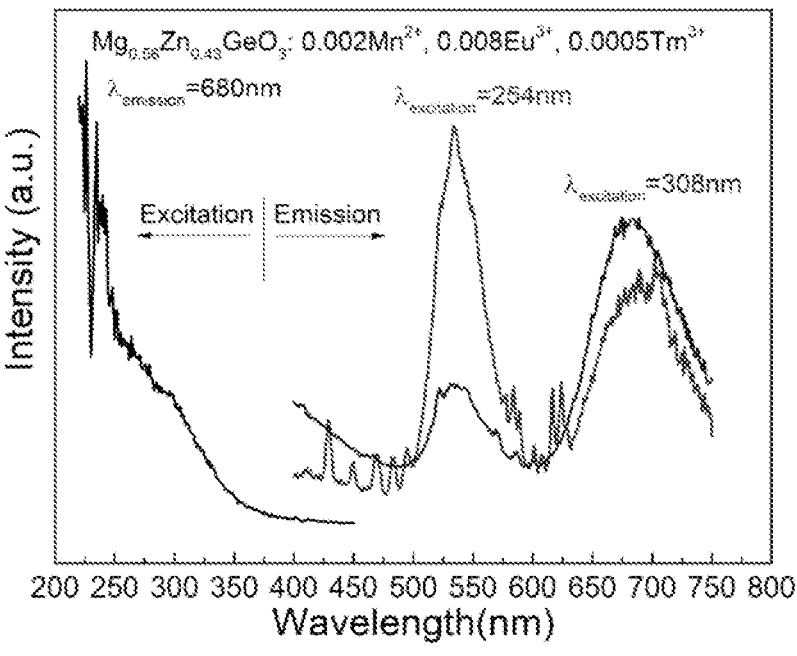
FIG. 8 shows excitation and emission spectra of $Mg_{0.56}Zn_{0.43}GeO_3$: $0.002Mn^{2+}$, $0.008Eu^{3+}$, $0.0005Tm^{3+}$ according to Example 3.

The excitation and emission spectra of $Mg_{0.56}Zn_{0.43}GeO_3$: $0.002Mn^{2+}$, $0.008Eu^{3+}$, $0.0005Tm^{3+}$ is shown in FIG. 8. Two emission peaks can be observed with one centered at 680 nm and the other centered at 530 nm, demonstrating a red and green emission. The effective excitation was ranging in UV region with a peak of 230 nm.

Figure 9:
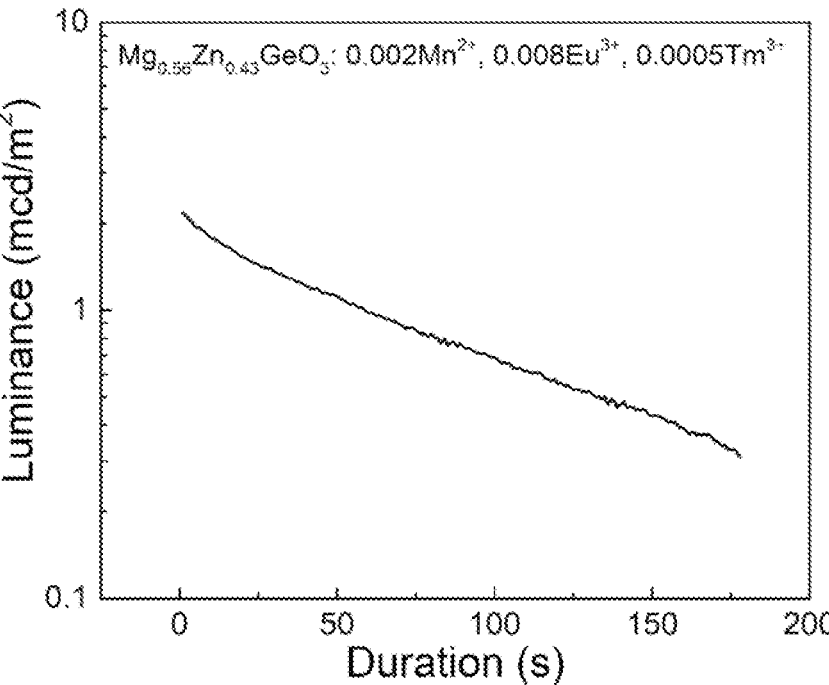
FIG. 9 shows afterglow duration of $Mg_{0.56}Zn_{0.43}GeO_3$: $0.002Mn^{2+}$, $0.008Eu^{3+}$, $0.0005Tm^{3+}$, based on the testing standard of DIN 67510-1.

The tested afterglow duration of $Mg_{0.56}Zn_{0.43}GeO_3$: $0.002Mn^{2+}$, $0.008Eu^{3+}$, $0.0005Tm^{3+}$, based on the testing standard of DIN 67510-1, is shown in FIG. 9. The tested afterglow duration was only 3 minutes. Without adding an excessive amount of germanium, although the afterglow is still peaked at 680 nm, the afterglow duration decreases significantly, while most of the photon energy consumes on 530 nm green florescent emission. Thus in the present invention, an excessive amount of germanium helps host to form a compact crystal lattice and avoid of 530 nm green florescent emission.

Example 4

Based on the formula of $Mg_{0.56}Zn_{0.43}Ge_{1.2}O_3$: $0.002Mn^{2+}$, $0.008Eu^{3+}$, $0.0005Er^{3+}$, the following starting materials were weighted: 20.100 of magnesium hydroxide ($Mg(OH)_2$) (0.56 mol in terms of Mg), 21.580 g of zinc oxide (ZnO) (0.43 mol in terms of Zn), 77.282 g of germanium oxide ($GeO_2$) (1.2 mol in terms of Ge), 0.088 g of manganese oxide (MnO) (0.002 mol in terms of Mn), 0.920 g of europium oxide ($Eu_2O_3$) (0.008 mol in terms of Eu), and 0.064 g of erbium oxide ($Er_2O_3$) (0.0005 mol in terms of Er).

The above starting materials were then put into a nylon ball milling jar with zirconia milling balls. The milling medium is ethanol. A planetary mill machine was adopted to sufficiently mix the starting materials for 2 hours.

The resulting mixture was transferred into a clean tray and baked at 80° C. for overnight to fully evaporate ethanol. Then the dried mixture was sieved with a 120 mesh sieve.

The sieved mixture was put into an aluminum oxide crucible with an aluminum oxide lid covered on. Place the above into a muffle furnace. Heat the furnace from room temperature to 1220° C. with a rate of 5° C. per minute. Keep sintering at 1220° C. for 5 hours and naturally cool down to room temperature. All of the heating, sintering and cooling process were conducted in air atmosphere.

The resulted product was made to powder, through a grinding step, to obtain the red-luminescent long-afterglow phosphor.

Figure 10:
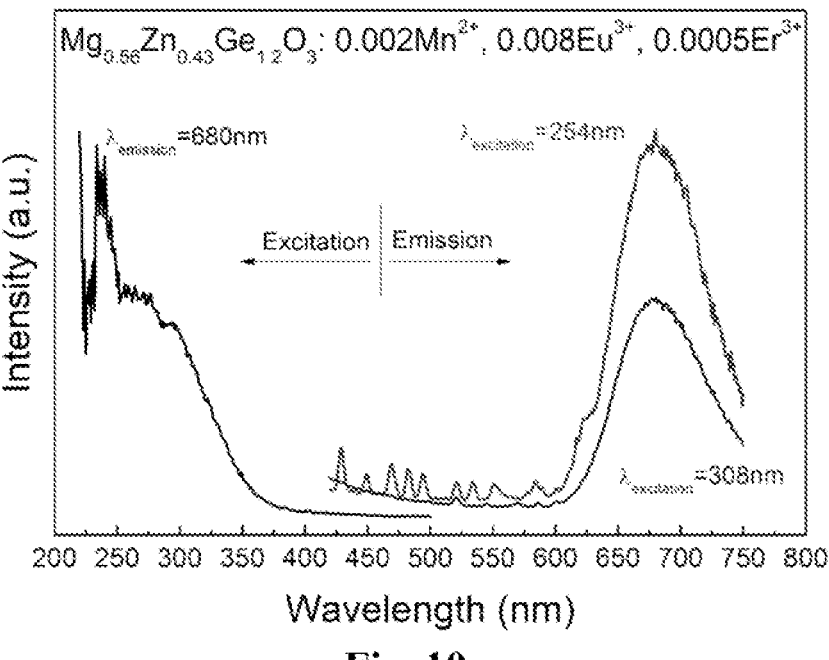
FIG. 10 shows excitation and emission spectra of $Mg_{0.56}Zn_{0.43}Ge_{1.2}O_3$: $0.002Mn^{2+}$, $0.008Eu^{3+}$, $0.0005Er^{3+}$ according to Example 4.

The excitation and emission spectra of $Mg_{0.56}Zn_{0.43}Ge_{1.2}O_3$: $0.002Mn^{2+}$, $0.008Eu^{3+}$, $0.0005Er^{3+}$ is shown in FIG. 10. The emission peak centered at 680 nm, demonstrating a pure red emission. The effective excitation was ranging in UV region with a peak of 230 nm.

Figure 11:
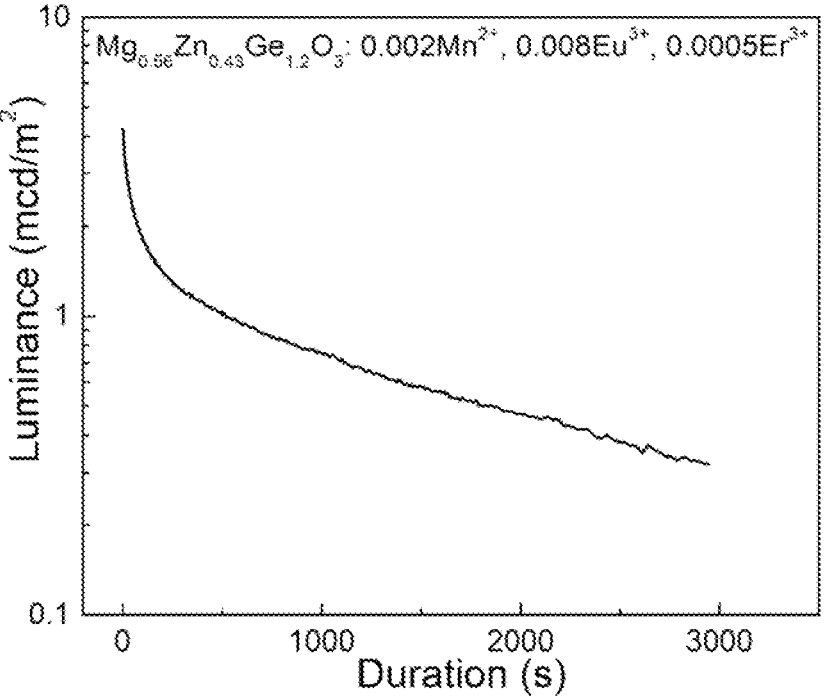
FIG. 11 shows afterglow duration of $Mg_{0.56}Zn_{0.43}Ge_{1.2}O_3$: $0.002Mn^{2+}$, $0.008Eu^{3+}$, $0.0005Er^{3+}$, based on the testing standard of DIN 67510-1.

The tested afterglow duration of $Mg_{0.56}Zn_{0.43}Ge_{1.2}O_3$: $0.002Mn^{2+}$, $0.008Eu^{3+}$, $0.0005Er^{3+}$, based on the testing standard of DIN 67510-1, is shown in FIG. 11. The tested afterglow duration was 50 minutes.

Example 5

Based on the formula of $Mg_{0.56}Zn_{0.43}Ge_{1.2}O_3$: $0.002Mn^{2+}$, $0.008Eu^{3+}$, $0.0005Ho^{3+}$, the following starting materials were weighted: 20.100 of magnesium hydroxide ($Mg(OH)_2$) (0.56 mol in terms of Mg), 21.580 g of zinc oxide (ZnO) (0.43 mol in terms of Zn), 77.282 g of germanium oxide ($GeO_2$) (1.2 mol in terms of Ge), 0.088 g of manganese oxide (MnO) (0.002 mol in terms of Mn), 0.920 g of europium oxide ($Eu_2O_3$) (0.008 mol in terms of Eu), and 0.062 g of holmium oxide ($Ho_2O_3$) (0.0005 mol in terms of Ho).

The above starting materials were then put into a nylon ball milling jar with zirconia milling balls. The milling medium is ethanol. A planetary mill machine was adopted to sufficiently mix the starting materials for 2 hours.

The resulting mixture was transferred into a clean tray and baked at 80° C. for overnight to fully evaporate ethanol. Then the dried mixture was sieved with a 120 mesh sieve.

The sieved mixture was put into an aluminum oxide crucible with an aluminum oxide lid covered on. Place the above into a muffle furnace. Heat the furnace from room temperature to 1220° C. with a rate of 5° C. per minute. Keep sintering at 1220° C. for 5 hours and naturally cool down to room temperature. All of the heating, sintering and cooling process were conducted in air atmosphere.

The resulted product was made to powder, through a grinding step, to obtain the red-luminescent long-afterglow phosphor.

Figure 12:
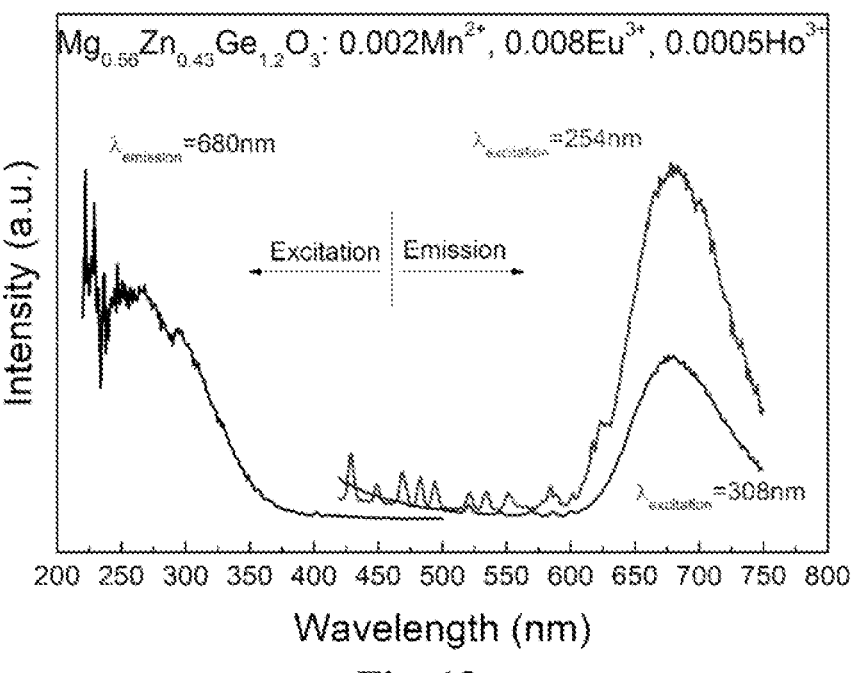
FIG. 12 shows excitation and emission spectra of $Mg_{0.56}Zn_{0.43}Ge_{1.2}O_3$: $0.002Mn^{2+}$, $0.008Eu^{3+}$, $0.0005Ho^{3+}$ according to Example 5.

The excitation and emission spectra of $Mg_{0.56}Zn_{0.43}Ge_{1.2}O_3$: $0.002Mn^{2+}$, $0.008Eu^{3+}$, $0.0005Ho^{3+}$ is shown in FIG. 12. The emission peak centered at 680 nm, demonstrating a pure red emission. The effective excitation was ranging in UV region with a peak of 230 nm.

Figure 13:
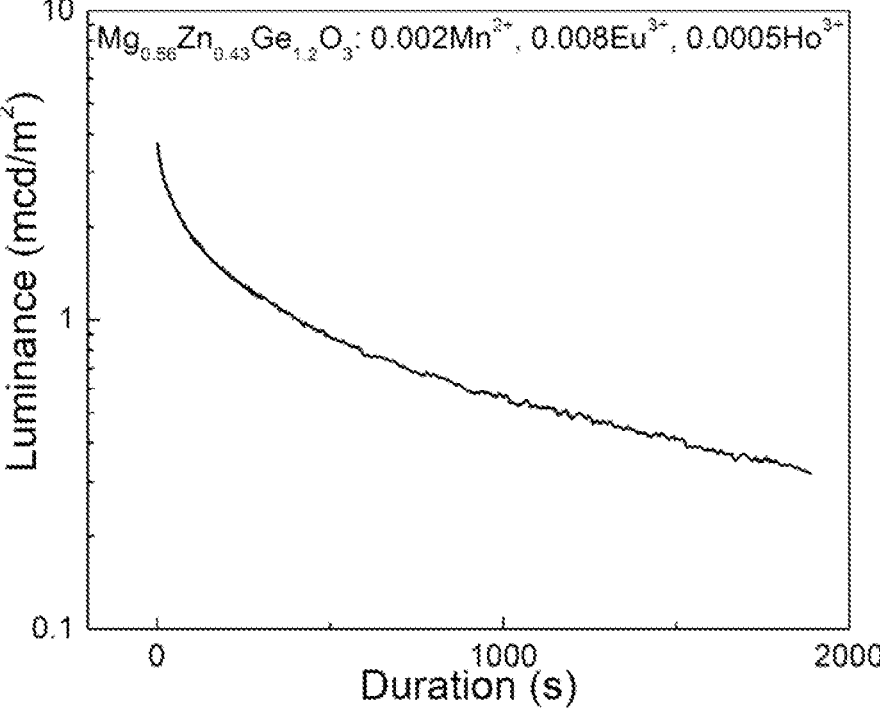
FIG. 13 shows afterglow duration of $Mg_{0.56}Zn_{0.43}Ge_{1.2}O_3$: $0.002Mn^{2+}$, $0.008Eu^{3+}$, $0.0005Ho^{3+}$, based on the testing standard of DIN 67510-1.

The tested afterglow duration of $Mg_{0.56}Zn_{0.43}Ge_{1.2}O_3$: $0.002Mn^{2+}$, $0.008Eu^{3+}$. $0.0005Ho^{3+}$, based on the testing standard of DIN 67510-1, is shown in FIG. 13. The tested afterglow duration was 32 minutes.

Example 6

Based on the formula of $Mg_{0.56}Zn_{0.43}Ge_{1.2}O_3$: $0.002Mn^{2+}$, $0.008Eu^{3+}$, $0.0005Pr^{3+}$, the following starting materials were weighted: 20.100 of magnesium hydroxide ($Mg(OH)_2$) (0.56 mol in terms of Mg), 21.580 g of zinc oxide (ZnO) (0.43 mol in terms of Zn), 77.282 g of germanium oxide ($GeO_2$) (1.2 mol in terms of Ge), 0.088 g of manganese oxide (MnO) (0.002 mol in terms of Mn), 0.920 g of europium oxide ($Eu_2O_3$) (0.008 mol in terms of Eu), and 0.056 g of praseodymium oxide ($Pr_6O_{11}$) (0.0005 mol in terms of Pr).

The above starting materials were then put into a nylon ball milling jar with zirconia milling balls. The milling medium is ethanol. A planetary mill machine was adopted to sufficiently mix the starting materials for 2 hours.

The resulting mixture was transferred into a clean tray and baked at 80° C. for overnight to fully evaporate ethanol. Then the dried mixture was sieved with a 120 mesh sieve.

The sieved mixture was put into an aluminum oxide crucible with an aluminum oxide lid covered on. Place the above into a muffle furnace. Heat the furnace from room temperature to 1220° C. with a rate of 5° C. per minute. Keep sintering at 1220° C. for 5 hours and naturally cool down to room temperature. All of the heating, sintering and cooling process were conducted in air atmosphere.

The resulted product was made to powder, through a grinding step, to obtain the red-luminescent long-afterglow phosphor.

Figure 14:
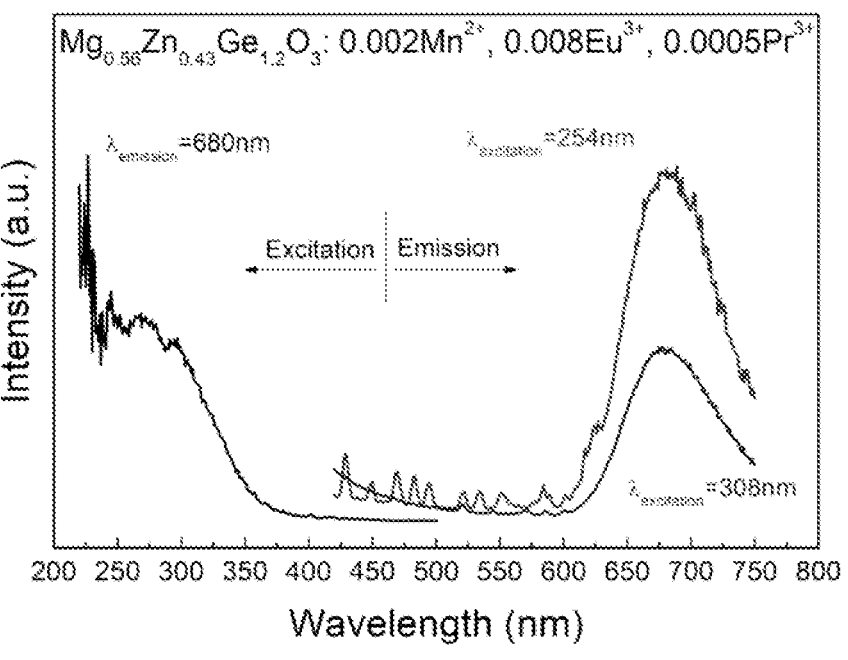
FIG. 14 shows excitation and emission spectra of $Mg_{0.56}Zn_{0.43}Ge_{1.2}O_3$: $0.002Mn^{2+}$, $0.008Eu^{3+}$, $0.0005Pr^{3+}$ according to Example 6.

The excitation and emission spectra of $Mg_{0.56}Zn_{0.43}Ge_{1.2}O_3$: $0.002Mn^{2+}$, $0.008Eu^{3+}$, $0.0005Pr^{3+}$ is shown in FIG. 14. The emission peak centered at 680 nm, demonstrating a pure red emission. The effective excitation was ranging in UV region with a peak of 230 nm.

Figure 15:
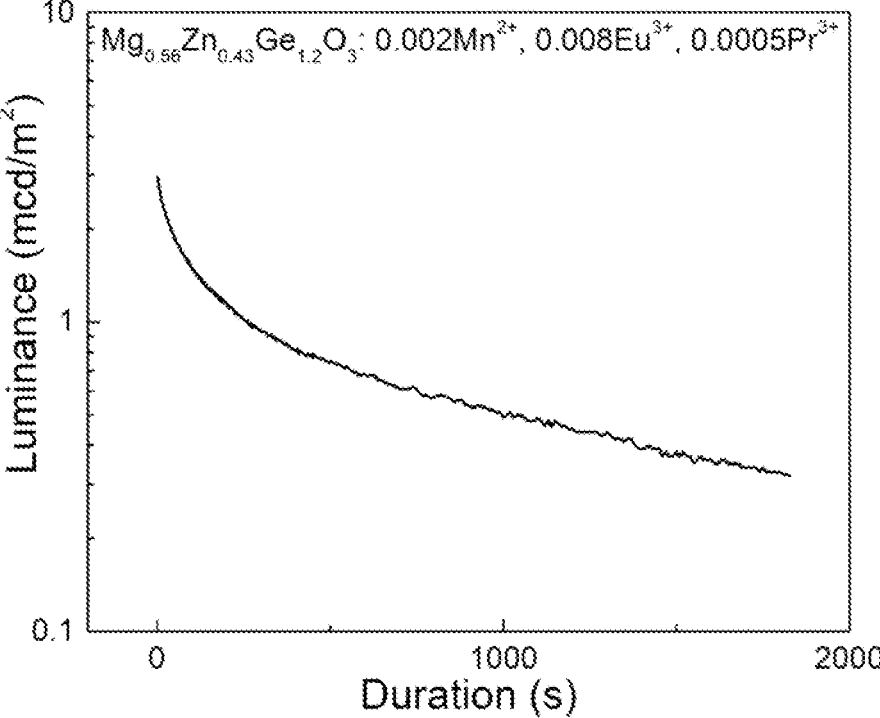
FIG. 15 shows afterglow duration of $Mg_{0.56}Zn_{0.43}Ge_{1.2}O_3$: $0.002Mn^{2+}$, $0.008Eu^{3+}$, $0.0005Pr^{3+}$, based on the testing standard of DIN 67510-1.

The tested afterglow duration of $Mg_{0.56}Zn_{0.43}Ge_{1.2}O_3$: $0.002Mn^{2+}$, $0.008Eu^{3+}$, $0.0005Pr^{3+}$, based on the testing standard of DIN 67510-1, is shown in FIG. 15. The tested afterglow duration was 31 minutes.

Example 7

Based on the formula of $Mg_{0.56}Zn_{0.43}Ge_{1.2}O_3$: $0.002Mn^{2+}$, $0.008Eu^{3+}$, $0.0005Nd^{3+}$, the following starting materials were weighted: 20.100 of magnesium hydroxide ($Mg(OH)_2$) (0.56 mol in terms of Mg), 21.580 g of zinc oxide (ZnO) (0.43 mol in terms of Zn), 77.282 g of germanium oxide ($GeO_2$) (1.2 mol in terms of Ge), 0.088 g of manganese oxide (MnO) (0.002 mol in terms of Mn), 0.920 g of europium oxide ($Eu_2O_3$) (0.008 mol in terms of Eu), and 0.056 g of neodymium oxide ($Nd_2O_3$) (0.0005 mol in terms of Nd).

The above starting materials were then put into a nylon ball milling jar with zirconia milling balls. The milling medium is ethanol. A planetary mill machine was adopted to sufficiently mix the starting materials for 2 hours.

The resulting mixture was transferred into a clean tray and baked at 80° C. for overnight to fully evaporate ethanol. Then the dried mixture was sieved with a 120 mesh sieve.

The sieved mixture was put into an aluminum oxide crucible with an aluminum oxide lid covered on. Place the above into a muffle furnace. Heat the furnace from room temperature to 1220° C. with a rate of 5° C. per minute. Keep sintering at 1220° C. for 5 hours and naturally cool down to room temperature. All of the heating, sintering and cooling process were conducted in air atmosphere.

The resulted product was made to powder, through a grinding step, to obtain the red-luminescent long-afterglow phosphor.

Figure 16:
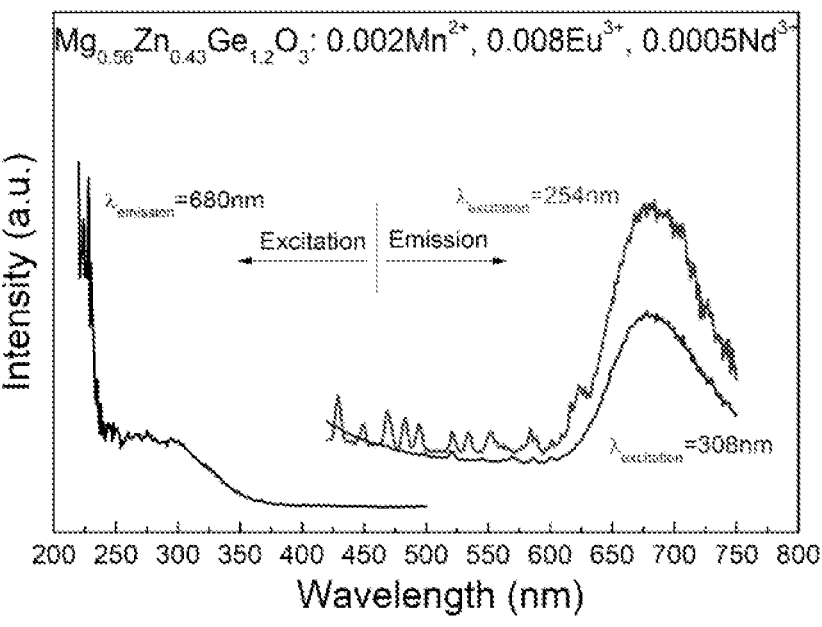
FIG. 16 shows excitation and emission spectra of $Mg_{0.56}Zn_{0.43}Ge_{1.2}O_3$: $0.002Mn^{2+}$, $0.008Eu^{3+}$, $0.0005Nd^{3+}$ according to Example 7.

The excitation and emission spectra of $Mg_{0.56}Zn_{0.43}Ge_{1.2}O_3$: $0.002Mn^{2+}$, $0.008Eu^{3+}$, $0.0005Nd^{3+}$ is shown in FIG. 16. The emission peak centered at 680 nm, demonstrating a pure red emission. The effective excitation was ranging in UV region with a peak of 230 nm.

Figure 17:
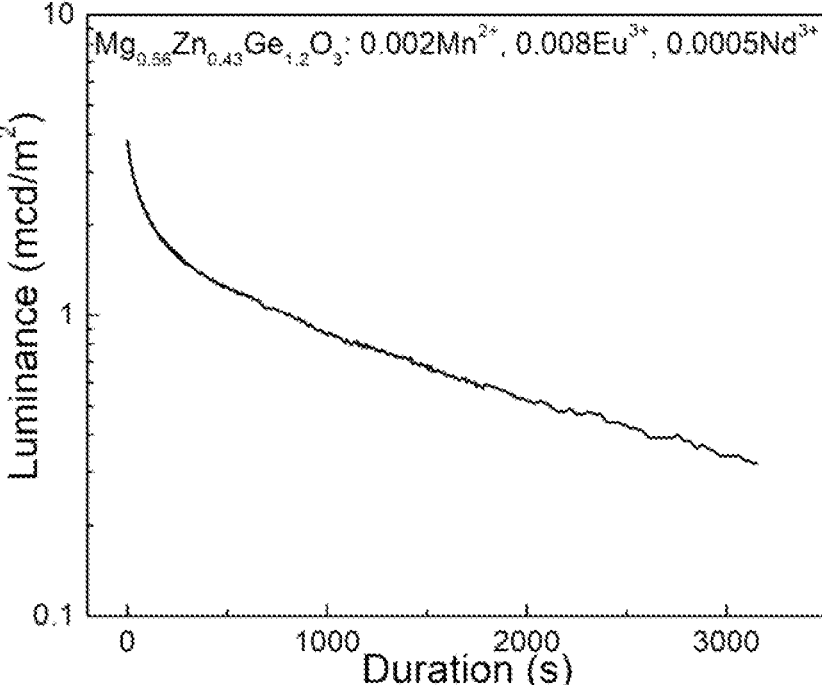
FIG. 17 shows afterglow duration of $Mg_{0.56}Zn_{0.43}Ge_{1.2}O_3$: $0.002Mn^{2+}$, $0.008Eu^{3+}$, $0.0005Nd^{3+}$, based on the testing standard of DIN 67510-1.

The tested afterglow duration of $Mg_{0.56}Zn_{0.43}Ge_{1.2}O_3$: $0.002Mn^{2+}$, $0.008Eu^{3+}$, $0.0005Nd^{3+}$, based on the testing standard of DIN 67510-1, is shown in FIG. 17. The tested afterglow duration was 53 minutes.

Example 8

Based on the formula of $Mg_{0.49}Zn_{0.50}GeO_3$: $0.002Mn^{2+}$, $0.003Eu^{3+}$, $0.001Sm^{3+}$, the following starting materials were weighted: 17.288 g of magnesium hydroxide ($Mg(OH)_2$) (0.49 mol in terms of Mg), 24.616 g of zinc oxide (ZnO) (0.50 mol in terms of Zn), 63.274 g of germanium oxide ($GeO_2$) (1.0 mol in terms of Ge), 0.086 g of manganese oxide (MnO) (0.002 mol in terms of Mn), 0.319 g of europium oxide ($Eu_2O_3$) (0.003 mol in terms of Eu), and 0.106 g of samarium oxide ($Sm_2O_3$) (0.001 mol in terms of Sm).

The above starting materials were then put into a nylon ball milling jar with zirconia milling balls. The milling medium is ethanol. A planetary mill machine was adopted to sufficiently mix the starting materials for 2 hours.

The resulting mixture was transferred into a clean tray and baked at 80° C. for overnight to fully evaporate ethanol. Then the dried mixture was sieved with a 120 mesh sieve.

The sieved mixture was put into an aluminum oxide crucible with an aluminum oxide lid covered on. Place the above into a muffle furnace. Heat the furnace from room temperature to 1220° C. with a rate of 5 degrees centigrade per minute. Keep sintering at 1220° C. for 5 hours and naturally cool down to room temperature. All of the heating, sintering and cooling process were conducted in air atmosphere.

The resulted product was made to powder, through a grinding step, to obtain the red-luminescent long-afterglow phosphor.

Figure 18:
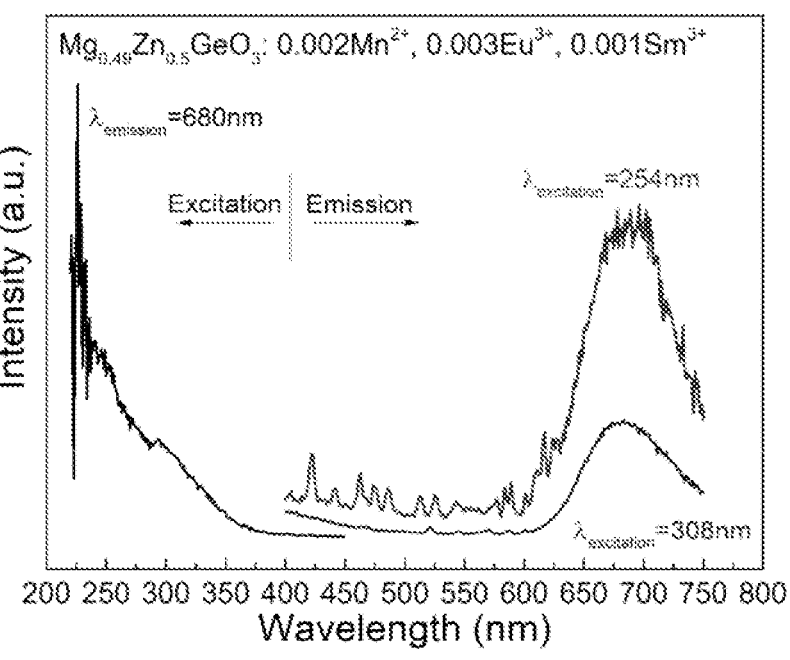
FIG. 18 shows excitation and emission spectra of $Mg_{0.49}Zn_{0.50}GeO_3$: $0.002Mn^{2+}$, $0.003Eu^{3+}$, $0.001Sm^{3+}$ according to Example 8.

The excitation and emission spectra of $Mg_{0.49}Zn_{0.50}GeO_3$: $0.002Mn^{2+}$, $0.003Eu^{3+}$, $0.001Sm^{3+}$ is shown in FIG. 18. The emission peak centered at 680 nm, demonstrating a pure red emission. The effective excitation was ranging in UV region with a peak of 230 nm.

Figure 19:
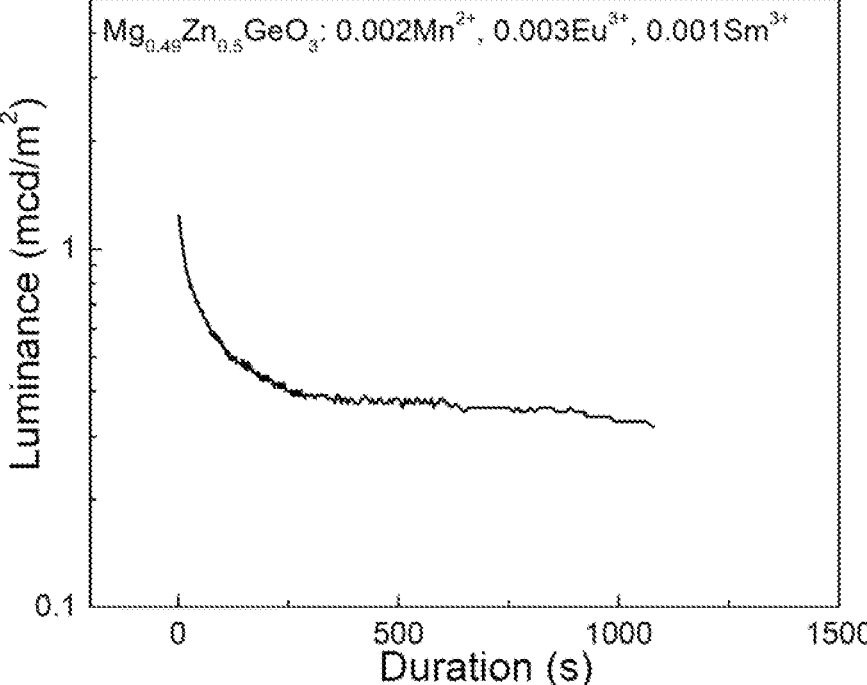
FIG. 19 shows afterglow duration of $Mg_{0.49}Zn_{0.50}GeO_3$: $0.002Mn^{2+}$, $0.003Eu^{3+}$, $0.001Sm^{3+}$, based on the testing standard of DIN 67510-1.

The tested afterglow duration of $Mg_{0.49}Zn_{0.50}GeO_3$: $0.002Mn^{2+}$, $0.003Eu^{3+}$, $0.001Sm^{3+}$, based on the testing standard of DIN 67510-1, is shown in FIG. 19. The tested afterglow duration was 18 minutes.

Example 9

Based on the formula of $Mg_{0.49}Zn_{0.50}GeO_3$: $0.002Mn^{2+}$, $0.0003Eu^{3+}$, $0.0003Yb^{3+}$, the following starting materials were weighted: 16.125 g of magnesium hydroxide ($Mg(OH)_2$) (0.49 mol in terms of Mg), 22.605 g of zinc oxide (ZnO) (0.50 mol in terms of Zn), 69.725 g of germanium oxide ($GeO_2$) (1.0 mol in terms of Ge), 0.079 g of manganese oxide (MnO) (0.002 mol in terms of Mn), 0.029 g of europium oxide ($Eu_2O_3$) (0.0003 mol in terms of Eu), and 0.033 g of ytterbium oxide ($Yb_2O_3$) (0.0003 mol in terms of Yb).

The above starting materials were then put into a nylon ball milling jar with zirconia milling balls. The milling medium is ethanol. A planetary mill machine was adopted to sufficiently mix the starting materials for 2 hours.

The resulting mixture was transferred into a clean tray and baked at 80° C. for overnight to fully evaporate ethanol. Then the dried mixture was sieved with a 120 mesh sieve.

The sieved mixture was put into an aluminum oxide crucible with an aluminum oxide lid covered on. Place the above into a muffle furnace. Heat the furnace from room temperature to 1220° C. with a rate of 5° C. per minute. Keep sintering at 1220° C. for 5 hours and naturally cool down to room temperature. All of the heating, sintering and cooling process were conducted in air atmosphere.

The resulted product was made to powder, through a grinding step, to obtain the red-luminescent long-afterglow phosphor.

Figure 20:
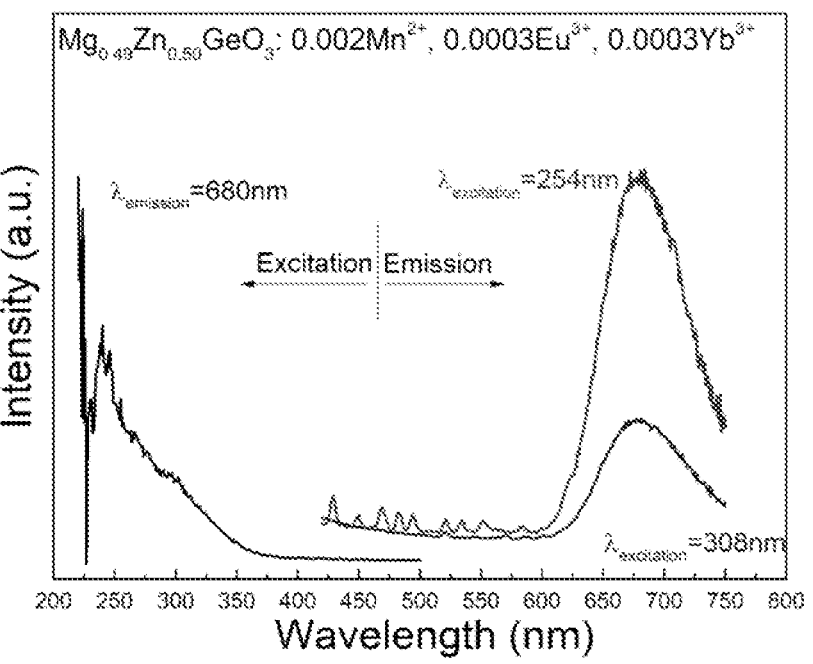
FIG. 20 shows excitation and emission spectra of $Mg_{0.49}Zn_{0.50}GeO_3$: $0.002Mn^{2+}$, $0.0003Eu^{3+}$, $0.0003Yb^{3+}$ according to Example 9.

The Excitation and emission spectra of $Mg_{0.49}Zn_{0.50}GeO_3$: $0.002Mn^{2+}$, $0.0003Eu^{3+}$, $0.0003Yb^{3+}$ is shown in FIG. 20. The emission peak centered at 680 nm, demonstrating a pure red emission. The effective excitation was ranging in UV region with a peak of 230 nm.

Figure 21:
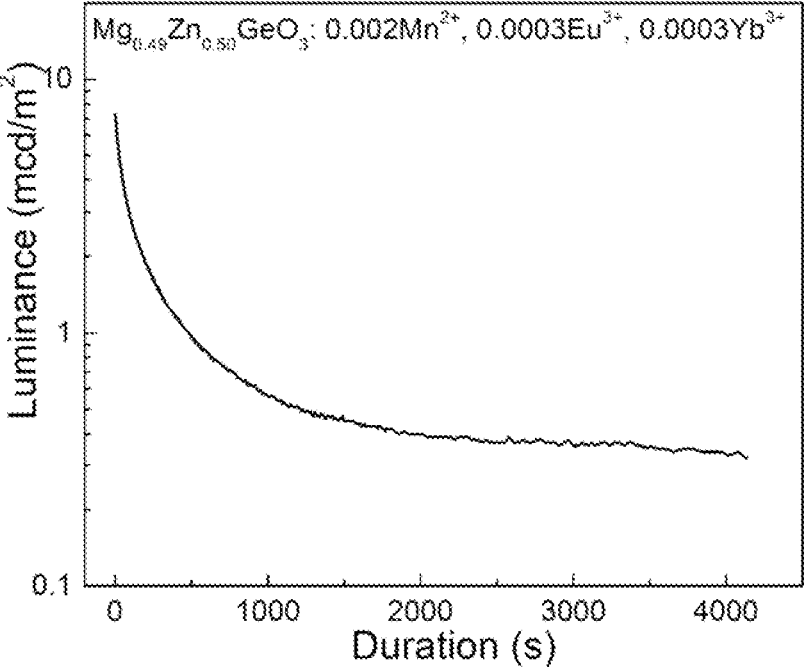
FIG. 21 shows afterglow duration of $Mg_{0.49}Zn_{0.50}GeO_3$: $0.002Mn^{2+}$, $0.0003Eu^{3+}$, $0.0003Yb^{3+}$, based on the testing standard of DIN 67510-1.

The tested afterglow duration of $Mg_{0.49}Zn_{0.50}GeO_3$: $0.002Mn^{2+}$, $0.0003Eu^{3+}$, $0.0003Yb^{3+}$, based on the testing standard of DIN 67510-1, is shown in FIG. 21. The tested afterglow duration was 69 minutes.

The comparisons of afterglow luminance of the synthesized samples mentioned above are shown in Table 1, wherein the relative afterglow luminance of each sample are shown by taking the afterglow luminance of $Mg_{0.4977}Zn_{0.5}GeO_3$: $0.002Mn^{2+}$, $0.0003Eu^{3+}$ as prior art or 100.

a molar ratio of $Eu^{3+}$ to the host material, and c is a molar ratio of $R^{3+}$ to the host material, wherein $0.95 \leq x+y \leq 0.99$, $0.3 \leq x \leq 0.7$.

2. The phosphor according to claim 1, wherein $1.00 \leq z \leq 1.5$.

3. The phosphor according to claim 1, wherein $0.0001 \leq a \leq 0.02$.

4. The phosphor according to claim 1, wherein $0.0001 \leq b \leq 0.05$.

5. The phosphor according to claim 1, wherein $0.0001 \leq c \leq 0.005$.

6. The phosphor according to claim 1, wherein $c < b$, and b is at least 2 times greater than c.

7. The phosphor according to claim 1, wherein $0.95 \leq x+y \leq 0.99$, $0.3 \leq x \leq 0.7$, $1.0 \leq z \leq 1.5$, $0.0001 \leq a \leq 0.02$, $0.0001 \leq b \leq 0.05$, $0.0001 \leq c \leq 0.005$, $c < b$, wherein b is at least 2 times greater than c.

8. The phosphor according to claim 1, wherein R is Tm, $0.50 \leq x \leq 0.60$, $0.95 \leq x+y \leq 0.99$, $1.0 \leq z \leq 1.3$, $0.001 \leq a \leq 0.003$, $0.006 \leq b \leq 0.01$, $0.0002 \leq c \leq 0.001$.

TABLE 1

| | After 1 s | After 60 s | After 300 s | After 600 s | After 1200 s | After 1800 s | After 2400 s | After 3000 s |
|---|---|---|---|---|---|---|---|---|
| Example No. | | | | | | | | |
| prior art | 100 | 100 | 100 | 100 | 100 | 100 | 100 | 100 |
| 1-host1 | 41 | 55 | 76 | 85 | 97 | 97 | 111 | 119 |
| 2-host2 | 1267 | 697 | 271 | 158 | 110 | 100 | 100 | 103 |
| 3-host3 | 28 | 25 | 0 | 0 | 0 | 0 | 0 | 0 |
| 4-Er | 55 | 56 | 68 | 78 | 87 | 86 | 87 | 0 |
| 5-Ho | 48 | 56 | 99 | 64 | 62 | 59 | 0 | 0 |
| 6-Pr | 38 | 46 | 53 | 56 | 58 | 57 | 0 | 0 |
| 7-Nd | 50 | 63 | 84 | 97 | 101 | 102 | 98 | 94 |
| 8-Sm | 16 | 16 | 22 | 31 | 0 | 0 | 0 | 0 |
| 9-Yb | 95 | 93 | 81 | 69 | 66 | 72 | 82 | 100 |

Afterglow (Relative luminance) tested based on the standard of DIN 67510-1

As described above, by appropriately designing the host formulation as well as activator, first sensitizer and second sensitizer, the red-luminescent long-afterglow phosphor of the present invention performs excellent luminescence performance including long afterglow duration and an emission peak of 680 nm, indicating red luminescence. The synthesis process is easy and environmental friendly. The resulted phosphor is chemically stable. The powder color of the present phosphor at non-excited state is white and can be applied into polymer matrix to prepare luminescent inks, paints, plastics, etc without deviation of polymer matrix color itself.

Thus, it can be seen that an improved red-luminescent phosphor with long afterglow has been disclosed which eliminates or at least diminishes the disadvantages and problems associated with prior art products and processes.

Although the invention has been described in terms of certain embodiments, other embodiments apparent to those of ordinary skill in the art are also within the scope of this invention. Accordingly, the scope of the invention is intended to be defined only by the claims which follow.

What is claimed is:

1. A phosphor having a chemical formula: $Mg_xZn_yGe_zO_3$: $aMn^{2+}$, $bEu^{3+}$, $cR^{3+}$, wherein R is an element selected from the group consisting of erbium (Er), thulium (Tm), holmium (Ho), samarium (Sm), praseodymium (Pr), ytterbium (Yb) and neodymium (Nd); $Mg_xZn_yGe_zO_3$ is a host material; and x, y, z, a, b and c are each independently a positive number, wherein a is a molar ratio of $Mn^{2+}$ to the host material, b is

9. The phosphor according to claim 1, wherein R is Tm, $0.35 \leq x \leq 0.42$, $0.95 \leq x+y \leq 0.99$, $1.0 \leq z \leq 1.3$, $0.005 \leq a \leq 0.02$, $0.002 \leq b \leq 0.008$, $0.0002 \leq c \leq 0.001$.

10. The phosphor according to claim 1, wherein R is Er, $0.35 \leq x \leq 0.57$, $0.95 \leq x+y \leq 0.99$, $1.0 \leq z \leq 1.3$, $0.001 \leq a \leq 0.008$, $0.005 \leq b \leq 0.01$, $0.0002 \leq c \leq 0.001$.

11. The phosphor according to claim 1, wherein R is Ho, $0.35 \leq x \leq 0.57$, $0.95 \leq x+y \leq 0.99$, $1.0 \leq z \leq 1.3$, $0.001 \leq a \leq 0.008$, $0.005 \leq b \leq 0.01$, $0.0002 \leq c \leq 0.001$.

12. The phosphor according to claim 1, wherein R is Pr, $0.35 \leq x \leq 0.57$, $0.95 \leq x+y \leq 0.99$, $1.0 \leq z \leq 1.3$, $0.001 \leq a \leq 0.008$, $0.005 \leq b \leq 0.01$, $0.0002 \leq c \leq 0.001$.

13. The phosphor according to claim 1, wherein R is Nd, $0.35 \leq x \leq 0.57$, $0.95 \leq x+y \leq 0.99$, $1.0 \leq z \leq 1.3$, $0.001 \leq a \leq 0.008$, $0.005 \leq b \leq 0.01$, $0.0002 \leq c \leq 0.001$.

14. The phosphor according to claim 1, wherein R is Sm, $0.35 \leq x \leq 0.50$, $0.95 \leq x+y \leq 0.99$, $1.0 \leq z \leq 1.3$, $0.001 \leq a \leq 0.008$, $0.002 \leq b \leq 0.01$, $0.0001 \leq c \leq 0.002$.

15. The phosphor according to claim 1, wherein R is Yb, $0.35 \leq x \leq 0.50$, $0.95 \leq x+y \leq 0.99$, $1.0 \leq z \leq 1.3$, $0.001 \leq a \leq 0.008$, $0.0002 \leq b \leq 0.01$, $0.0001 \leq c \leq 0.001$.

16. The phosphor according to claim 1, wherein the phosphor is a powder.

17. The phosphor according to claim 1, wherein the phosphor has an emission peak between 650-700 nm.

18. The phosphor according to claim 1, wherein the phosphor has an emission peak between 670-690 nm.

19. A method of preparing a phosphor, the method comprising: contacting a $Mg^{2+}$ salt of x mol, a $Zn^{2+}$ salt of y mol, $GeO_2$, a $Mn^{2+}$ salt, $Eu_2O_3$, and a metal oxide selected from the group consisting of $Er_2O_3$, $Tm_2O_3$, $Ho_2O_3$, $Sm_2O_3$, $Pr_6O_{11}$, $Yb_2O_3$ and $Nd_2O_3$, wherein each of the $Mg^{2+}$ salt and the $Zn^{2+}$ salt is independently an oxide, hydroxide, or carbonate salt; and the $Mn^{2+}$ salt is an oxide or carbonate salt; thereby forming a mixture; and sintering the mixture thereby forming the phosphor having a chemical formula: $Mg_xZn_yGe_zO_3$: $aMn^{2+}$, $bEu^{3+}$, $cR^{3+}$, wherein R is an element selected from the group consisting of Er, Tm, Ho, Sm, Pr, Yb and Nd; $Mg\ Zn\ Ge_zO_3$ is a host material; and x, y, z, a, b and c are each independently a positive number, wherein a is a molar ratio of $Mn^{2+}$ to the host material, b is a molar ratio of $Eu^{3+}$ to the host material, c is a molar ratio of $R^{3+}$ to the host material, $0.95 \leq x+y \leq 0.99$, and $0.3 \leq x \leq 0.7$.

* * * * *